United States Patent
Koyama

(10) Patent No.: US 6,556,667 B1
(45) Date of Patent: Apr. 29, 2003

(54) COMMUNICATION APPARATUS

(75) Inventor: Mituhiro Koyama, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/448,890

(22) Filed: Nov. 29, 1999

(30) Foreign Application Priority Data

Dec. 9, 1998 (JP) .......................................... 10-349486

(51) Int. Cl.$^7$ ............................................. H04M 11/00
(52) U.S. Cl. ................................. 379/93.17; 379/142.01
(58) Field of Search .......................... 379/93.17, 93.23, 379/100.14, 142.01, 142.04, 142.06, 142.14, 354, 355.01, 355.02, 356.01, 357.05, 88.21, 88.2, 88.19

(56) References Cited

U.S. PATENT DOCUMENTS

| | | | | |
|---|---|---|---|---|
| 6,064,725 A | * | 5/2000 | Nakanishi | 379/354 |
| 6,067,335 A | * | 5/2000 | Lim et al. | 379/142 |
| 6,339,639 B1 | * | 1/2001 | Henderson | 379/142.08 |
| 6,320,943 B1 | * | 11/2001 | Borland | 379/142.01 |

FOREIGN PATENT DOCUMENTS

| | | |
|---|---|---|
| JP | 9-238183 A | 9/1997 |
| JP | 10-155017 | 6/1998 |
| JP | 10-276259 | 10/1998 |

* cited by examiner

Primary Examiner—Stella Woo
(74) Attorney, Agent, or Firm—Nixon & Vanderhye P.C.

(57) ABSTRACT

An object of the present invention is to provide a communication apparatus capable of being connected to a communication line through which calling party information comes at the time of termination, wherein without bothering a user, it is possible to perform display of incoming call history, automatic dialing origination by using the display. In the communication apparatus, when a calling party information receiving section receives calling party information, a main controlling section reads the calling party information out of a specific area of a memory, and sequentially compares the calling party information received by the calling party information receiving section with the read calling party information. In the case where it is judged that they are not coincident with each other, the calling party information received by the calling party information receiving section and the incoming call date and time thereof are associated with each other and stored in an incoming call history area of the memory, and then the communication apparatus goes into a telephone answering mode. In the case where it is judged that calling party information coincident with the received calling party information is read out of the specific area of the memory, the communication apparatus goes into the telephone answering mode at once.

6 Claims, 4 Drawing Sheets

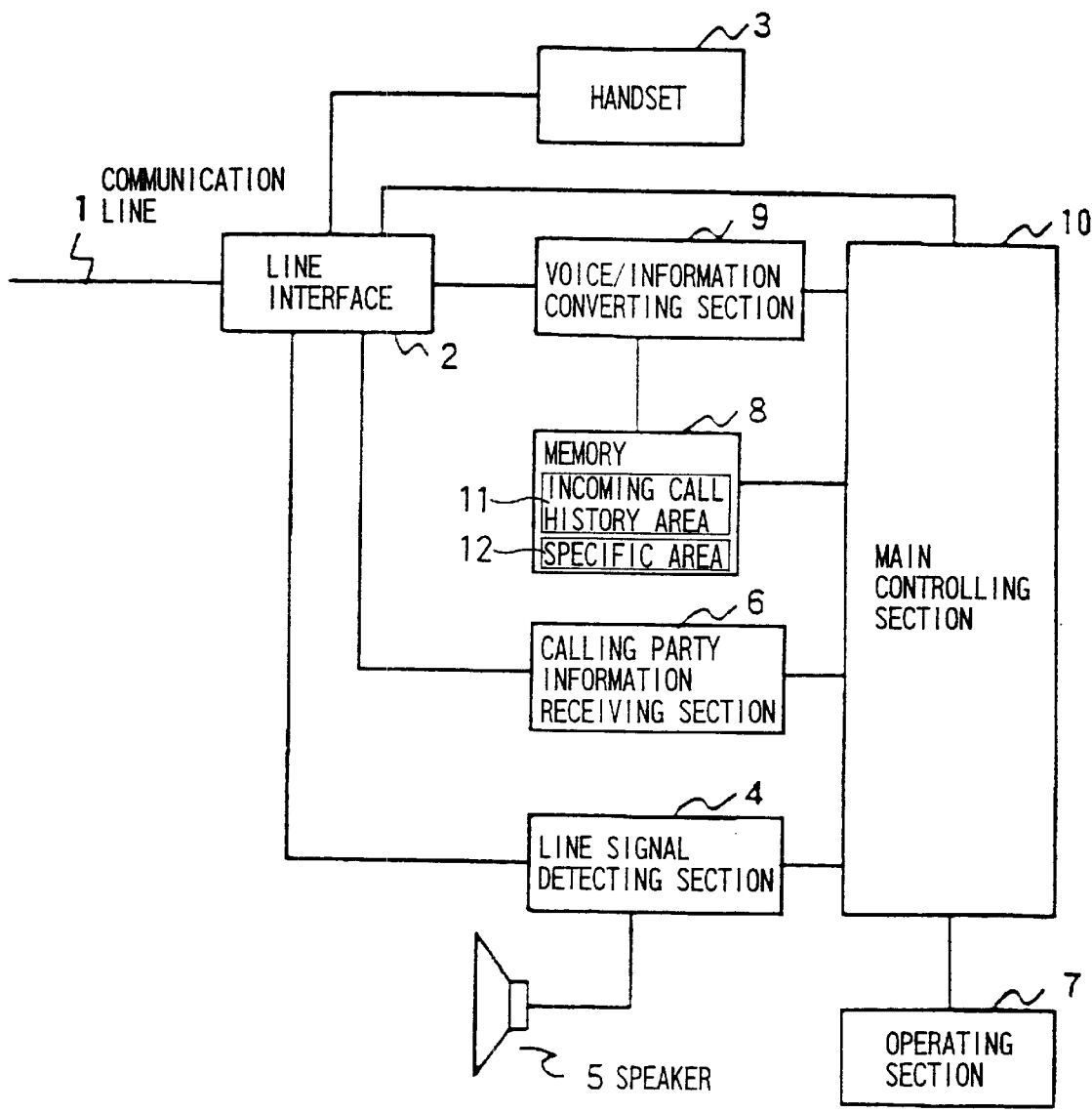

FIG. 2A

| No | CALLING PARTY INFORMATION | INCOMING CALL DATE AND TIME | | |
|---|---|---|---|---|
| 1 | 061234567 | 1998/12/01 12:00 | 1998/12/01 15:00 | |
| 2 | 0824123456 | 1998/12/01 12:55 | | |
| 3 | 0824234567 | 1998/12/02 08:22 | 1998/12/03 09:12 | 1998/12/03 10:56 |
| N | | | | |

FIG. 2B

| No | CALLING PARTY INFORMATION | ERASABLE OR UNERASABLE FLAG |
|---|---|---|
| 1 | 062345678 | ERASABLE |
| 2 | 0824345678 | UNERASABLE |
| 3 | 0124123456 | UNERASABLE |
| N | | |

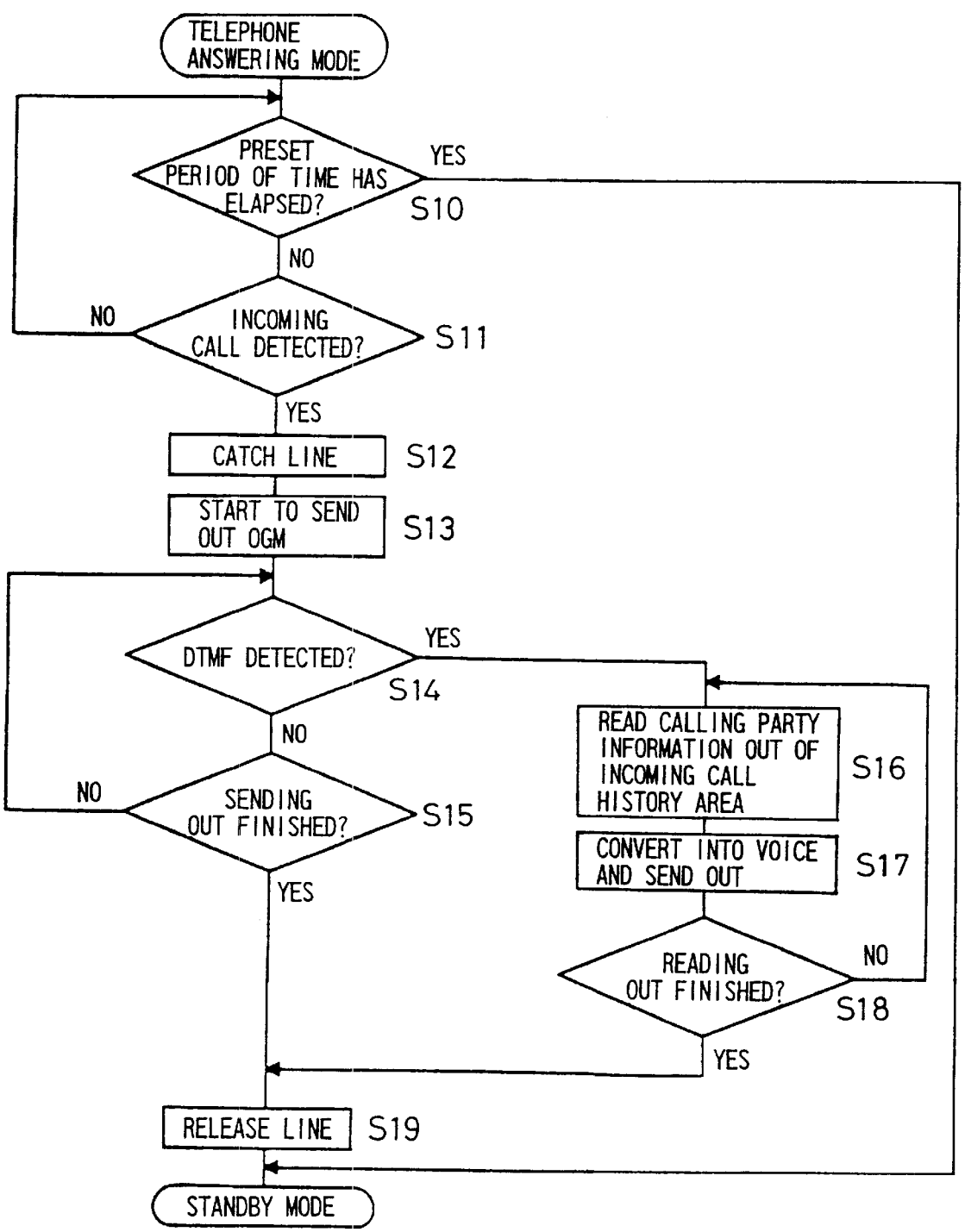

COMMUNICATION APPARATUS

BACKGROUND OF THE INVENTION

1. Field of the Invention

The present invention relates to a communication apparatus capable of being connected to a communication line through which calling party information comes at the time of termination.

2. Description of the Related Art

Previously, with regard to a communication apparatus capable of being connected to a communication line through which calling party information comes at the time of termination, such an apparatus has been proposed as is capable of unconditionally storing calling party information at the time of termination in order to create an incoming call history, and displaying the incoming call history, and capable of performing automatic dialing origination to a desired originator by designating desired calling party information in the displayed incoming call history and giving a direction to perform origination.

As an example of such a communication apparatus, Japanese Unexamined Patent Publication JP-A 9-238183 (1997) is known, disclosing a telephone set which is capable of creating an incoming call history. In the telephone set, telephone numbers and names are associated with each other and registered in a telephone directory memory area in advance. At the time of termination, the telephone set detects a calling party telephone number which is calling party information coming through a line network, and causes an incoming call history memory area to store the telephone number. Further, the telephone set retrieves whether or not the detected telephone number is coincident with any of the telephone numbers stored in the telephone directory memory area. In the case where a telephone number coincident with the detected telephone number is in existence, the telephone set reads name data corresponding to the telephone number out of the telephone directory memory area, associates the detected telephone number with the name data, and causes the incoming call history memory area to store them.

However, an apparatus which unconditionally stores calling party information at the time of termination, such as the existing communication apparatus as described above, stores even calling party information by which an originator cannot be defined, such as information in the case of nonnotification of calling party's telephone number and calling party information from a public telephone, and calling party information which may be received but would not be sent out, such as information regarding termination for downloading LCR data. It causes a problem that meaningless calling party information is displayed at the time of displaying the incoming call history and thereby the user is bothered. Particularly in the case where calling party information which may be received but would not be sent out, such as termination for downloading LCR data, is stored, automatic dialing origination might be performed for the purpose of confirming an originator at the time of displaying the incoming call history. It causes a problem that a communication charge is wasted in performing automatic dialing origination.

SUMMARY OF THE INVENTION

An object of the invention is to provide a communication apparatus which is capable of performing display of incoming call history, performing automatic dialing origination by using the display of incoming call history, or the like, without bothering the user.

In order to achieve the object mentioned above, the invention provides a communication apparatus capable of being connected to a communication line through which calling party information comes at the time of termination, the communication apparatus comprising:

calling party information receiving means for receiving calling party information which comes through the communication line;

first storing means for storing the calling party information received by the calling party information receiving means;

second storing means for storing specific calling party information; and controlling means for, when the calling party information received by the calling party information receiving means is coincident with the calling party information stored in the second storing means, controlling so that the received calling party information is not stored in the first storing means.

According to the invention, when calling party information is received by the calling party information receiving means, the controlling means judges whether or not calling party information coincident with the received calling party information is stored in the second storing means, and only when it is judged that coincident calling party information is not stored, the received calling party information is stored in the first storing means, whereby it is possible to prevent specific calling party information from being stored in the first storing means. In this way, the communication apparatus is capable of storing calling party information except specific calling party information of all the calling party information received at the time of termination, so that the communication apparatus is capable of performing functions of display of incoming call history by using the calling party information stored in the first storing means, automatic dialing origination by using the display of incoming call history, or the like, without bothering the user.

In addition to the configuration of the invention described above, it is preferable that the communication apparatus of the invention further comprises operating means for inputting and erasing calling party information, and based on a direction from the operating means, the controlling means stores the calling party information in the second storing means or erases the calling party information stored in the second storing means.

According to the invention, when the user gives a direction through the operating means to input or erase calling party information, the controlling means stores the calling party information in the second storing means or erases the calling party information stored in the second storing means based on the direction, whereby the user is capable of voluntarily setting specific calling party information which should not be stored in the first storing means. In this way, the user is capable of voluntarily setting specific calling party information, so that it is possible to make it easier to use the functions of display of incoming call history and performing automatic dialing origination by using the display of incoming call history in the communication apparatus.

In addition to the configuration of the invention described above, it is preferable that the second storing means is composed of an erasable area in which it is possible to erase calling party information based on an operation of the operating means and an unerasable area in which it is impossible to erase calling party information based on an operation of the operating means.

According to the invention, when a direction to erase calling party information is given by the operating means, the controlling means erases the calling party information stored in the erasable area of the second storing means based on the direction. In this way, the communication apparatus is capable of not only enabling the user to voluntarily set specific calling party information which should not be stored in the first storing means, but also preventing necessary specific calling party information from being erased by mistake.

As a result, the communication apparatus is capable of preventing operability from being degraded as a result of making it easier to use the functions of display of incoming call history, automatic dialing origination by using the display of incoming call history, or the like.

In addition to the configuration of the invention described above, it is preferable that also when the calling party information stored in the first storing means is coincident with the calling party information received by the calling party information receiving means, the controlling means controls so that the received calling party information is not stored in the first storing means.

According to the invention, when calling party information is received by the calling party information receiving means, the controlling means judges whether or not calling party information coincident with the received calling party information is stored in the first and second storing means, and only when it is judged that coincident calling party information is not stored, the received calling party information is stored in the first storing means. In this way, the communication apparatus is capable of not only controlling so that specific calling party information is not stored in the first storing means, but also preventing calling party information from being duplicately stored in the first storing means. As a result, the communication apparatus is capable of storing calling party information except specific calling party information and calling party information having already been stored of all the calling party information received at the time of termination, so that the communication apparatus is capable of performing the functions of automatic dialing origination by using the stored calling party information, or the like, while further preventing the user from being bothered.

In addition to the configuration of the invention described above, it is preferable that the communication apparatus of the invention further comprises voice information converting means for converting information which can be stored in the first storing means, into voice signals, and in the case where a preset signal comes through the communication line, the controlling means causes the voice information converting means to convert the information stored in the first storing means, into voice signals to send out the voice signals to the communication line.

According to the invention, in the case where the preset signal comes through the communication line, the controlling means causes the voice information converting means to convert the calling party information stored in the first storing means, into voice signals to send out the voice signals to the communication line. As a result, the user can obtain the calling party information which is stored as an incoming call history, by voice away from home. Moreover, in the communication apparatus of the invention, the calling party information which may be received but would not be sent out is not stored in the first storing means. Therefore, in the case where the user obtains calling party information by voice away from home, meaningless calling party information would not be converted into voice signals and sent out, and hence it is possible to shorten the period of time for listening to calling party information and reduce a communication charge. In addition, since it is prevented that calling party information is duplicately stored in the first storing means, single calling party information would not be converted into voice signals and sent out twice or more in the case where the user obtains calling party information by voice away from home, with the result that it is possible to further shorten the period of time for listening to calling party information and further reduce a communication charge.

BRIEF DESCRIPTION OF THE DRAWINGS

Other and further objects, features, and advantages of the invention will be more explicit from the following detailed description taken with reference to the drawings wherein:

FIG. 1 is a function block diagram showing an electrical configuration of a telephone answering machine which is an embodiment of a communication apparatus according to the invention;

FIGS. 2A and 2B are explanation views showing data configurations of calling party information which is stored in the telephone answering machine, in an incoming call history area and a specific area of a memory of the telephone answering machine shown in FIG. 1;

FIG. 4 is a flow chart showing operation control at the time of termination during a telephone answering mode in the telephone answering machine shown in FIG. 1.

DETAILED DESCRIPTION OF THE PREFERRED EMBODIMENTS

Figure 3:
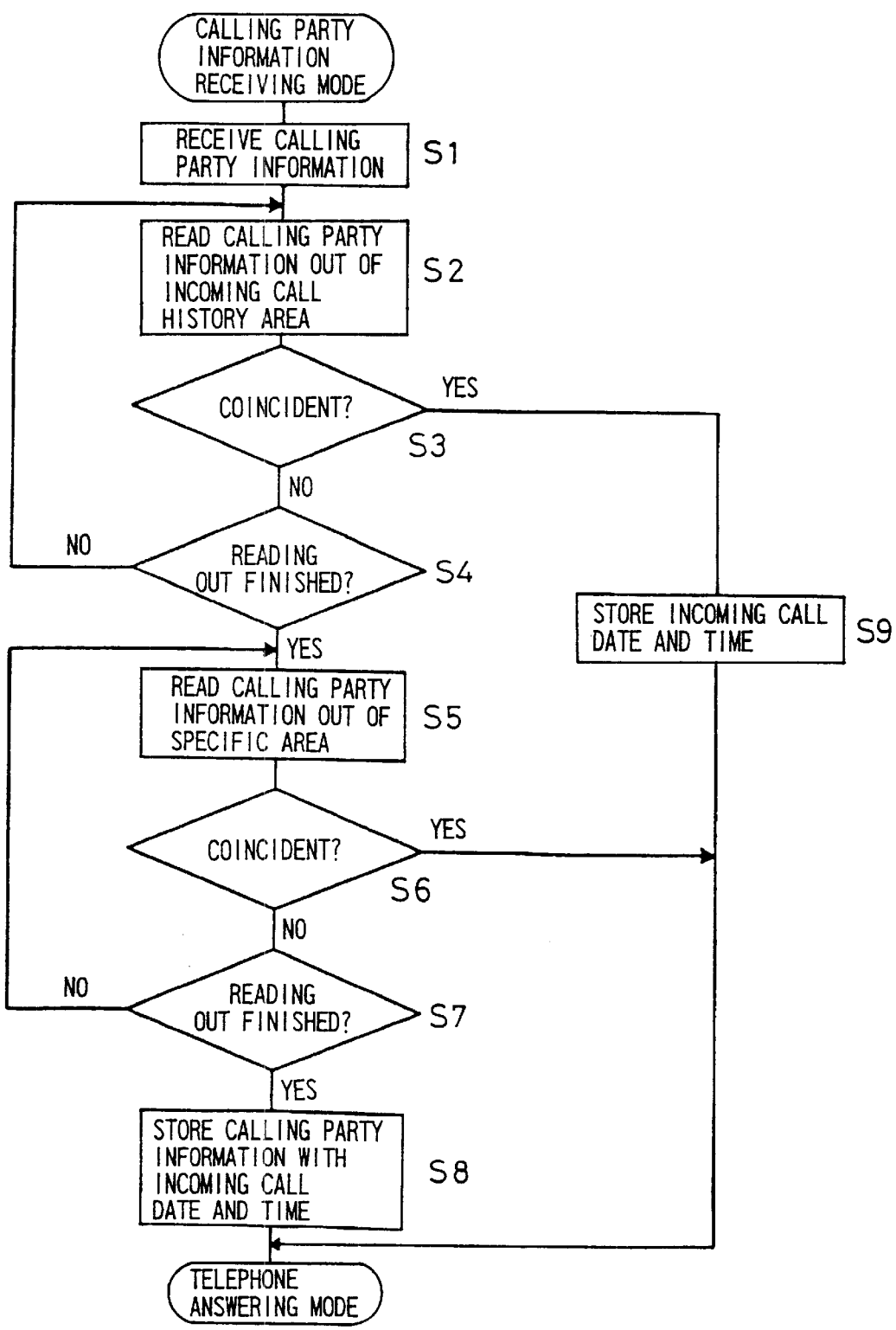
FIG. 3 is a flow chart showing operation control at the time of termination during a calling party information receiving mode in the telephone answering machine shown in FIG. 1.

Now referring to the drawings, preferred embodiments of the invention are described below.

FIG. 1 is a function block diagram showing an electrical configuration of a telephone answering machine which is an embodiment of a communication apparatus according to the invention, FIGS. 2A and 2B are explanation views showing data configurations of calling party information stored in the telephone answering machine shown in FIG. 1, and FIGS. 3 and 4 are flow charts showing operation control at the time of termination in the telephone answering machine shown in FIG. 1. In the following, the telephone answering machine which is an embodiment of the communication apparatus according to the invention will be explained referring to FIGS. 1 to 4.

The communication apparatus shown in FIG. 1 is connected to a communication line 1. The communication line 1 is configured so that calling party information comes through the communication line to the communication apparatus of a called party at the time of termination. The communication apparatus comprises a line interface 2, a handset 3, a line signal detecting section 4, a speaker 5, a calling party information receiving section 6, an operating section 7, a memory 8, a voice/information converting section 9, and a main controlling section 10.

The communication line 1 is connected to terminals of other subscribers via an exchange which is not shown. The line interface 2 catches and releases the communication line 1, and also establishes a call path to the terminal of the other subscriber to be connected via the communication line 1 which has been caught. Talking with a calling party is performed using the handset 3 through the call path established by the line interface 2.

The line signal detecting section 4 detects a signal which comes through the communication line 1. In addition, the line signal detecting section 4 has functions of detecting an incoming call signal and detecting a DTMF signal. The speaker 5 outputs a ringing tone based on the detected signal from the line signal detecting section 4. The calling party information receiving section 6 receives calling party information which comes through the communication line 1. The operating section 7 gives a direction to input a telephone number, or the like, and operate a variety of functions. The memory 8 stores calling party information, OGM information, ICM information, or the like. The voice/information converting section 9 performs conversion of information which can be stored in the memory 8, into voice signals, and conversion of voice signals into information which can be stored in the memory 8.

On the basis of the detected signal from the line signal detecting section 4, the calling party information received by the calling party information receiving section 6 and a direction signal from the operating section 7, the main controlling section 10 controls the line interface 2 to catch and release the line, controls the memory 8 to write and read data, and controls the voice/information converting section 9 to convert.

The memory 8 includes an incoming call history area 11 shown in FIG. 2A and a specific area 12 shown in FIG. 2B as areas for storing calling party information. In the incoming call history area 11, calling party information and an incoming call date and time are stored. In the specific area 12, calling party information and an erasable or unerasable flag are stored. Moreover, the calling party information received by the calling party information receiving section 6 is stored in the incoming call history area 11, and the calling party information input through the operating section 7 is stored in the specific area 12, respectively, on the basis of the writing control of the main controlling section 10. In addition, on the basis of the erasable or unerasable flag which is stored in association with the calling party information, the calling party information stored in the specific area 12 is classified into erasable calling party information or unerasable calling party information by the operation through the operating section 7.

Next, with regard to the telephone answering machine configured as shown above, the operation at the time of termination will be explained referring to the flow charts shown in FIGS. 3 and 4.

In the specific area of the memory 8, calling party information which is input through the operating section 7, and calling party information which may be received but would not be sent out, such as termination for downloading LCR data which is set at the time of production of the communication apparatus, are stored.

When it is detected in a standby mode that the polarity of the communication line 1 is reversed, the communication apparatus goes into a calling party information receiving mode shown in FIG. 3. During the calling party information receiving mode, when calling party information is received by the calling party information receiving section 6 (step S1), the main controlling section 10 reads calling party information about one call origination from the incoming call history area 11 (step S2), to compare with the calling party information received by the calling party information receiving section 6. The operation of reading and comparing the calling party information is repeated by changing calling party information to be read out (steps S3 and S4). In the case of judging that all of the calling party information stored in the incoming call history area 11 are not coincident with the received calling party information, the main controlling section 10 reads calling party information about one call origination from the specific area 12 of the memory 8 (step S5).

Then, the main controlling section 10 compares the calling party information which is read from the specific area 12 of the memory 8 with the calling party information received by the calling party information receiving section 6. The operation of reading and comparing the calling party information is repeated by changing calling party information to be read out (steps S6 and S7). In the case of judging that all of the calling party information stored in the specific area 12 are not coincident with the received calling party information, the main controlling section 10 causes the incoming call history area of the memory 8 to store the calling party information received by the calling party information receiving section 6 and the incoming call date and time of the received calling party information in association with each other (step S8). After that, the communication apparatus goes into a telephone answering mode shown in FIG. 4.

During the operation of sequentially comparing the calling party information which is read from the incoming call history area 11 of the memory 8 with the calling party information received by the calling party information receiving section 6 (steps S2 to S4), in the case where it is judged that the calling party information which is read out of the incoming call history area 11 is coincident with the received calling party information, the incoming call date and time of the received calling party information is associated with the calling party information stored in the incoming call history area which was judged to be coincident, and then stored (step S9). After that, the communication apparatus goes into the telephone answering mode shown in FIG. 4. During the operation of sequentially comparing the calling party information which is read from the specific area 12 of the memory 8 with the calling party information received by the calling party information receiving section 6 (steps S5 to S7), in the case where it is judged that the calling party information which is read out of the specific area 12 is coincident with the received calling party information, the received calling party information and the incoming call date and time thereof are not stored, and the communication apparatus goes into the telephone answering mode shown in FIG. 4 at once.

Then, during the telephone answering mode, when an incoming call signal is detected by the line signal detecting section 4 within a preset period of time (steps S10 and S11), the main controlling section 10 controls the line interface 2 to catch the communication line 1 (step S12), and causes the voice/information converting section 9 to convert the OGM information stored in the memory 8, into voice signals, thereby sending out the OGM which was converted into voice signals to a telephone set of calling party through the call path established by the line interface 2 (step S13). In the case where the preset period of time has elapsed while an incoming call signal is not detected by the line signal detecting section 4 (steps S10 and S11), the communication apparatus ends the telephone answering mode and goes into the standby mode.

Then, when a preset DTMF signal is detected by the line signal detecting section 4 while the OGM is sending out (steps S14 and S15), the main controlling section 10 causes the voice/information converting section 9 to sequentially convert the calling party information stored in the incoming call history area 11 of the memory 8, into voice signals, and sends out the voice signals to the telephone set of calling party through the call path established by the line interface 2 (steps S16 to S18). The operation of reading out calling party information, converting the calling party information into voice signals, and sending out the calling party information is repeated by changing calling party information. After that, when all of the calling party information stored in the incoming call history area 11 of the memory 8 are sent out as voice signals (step S18), the line interface 2 is controlled to release the communication line 1 (step S19), and the communication apparatus goes into the standby mode. In the case where sending out the OGM is finished while the preset DTMF signal is not detected by the line signal detecting section 4 (steps S14 and S15), the line interface 2 is controlled to release the communication line 1 (step S19), and the communication apparatus goes into the standby mode.

Therefore, according to the operation control as described above, it is possible to store calling party information except the specific calling party information and the calling party information having already been stored of all the calling party information received at the time of termination, and it is possible for the user to obtain the stored calling party information by voice away from home. Further, in the case where the user obtains calling party information by voice away from home, meaningless calling party information is not sent out, so that it is possible to shorten the period of time for listening to the calling party information, and it is also possible to reduce a communication charge.

In the embodiment shown above, as a method for storing calling party information in the specific area 12 of the memory 8, the calling party information is stored at the time of production of the communication apparatus, or stored by inputting through the operating section 7. However, the invention is not limited to such methods, and the calling party information may be stored by using a modem signal which comes from the communication line 1, or may be stored by data communication using infrared, for example.

Further, in the embodiment shown above, calling party information is associated with the erasable or unerasable flag and stored in the specific area 12 of the memory 8, and it is determined on the basis of the erasable or unerasable flag whether the calling party information is erased or not. However, the invention is not limited to such a method, and the specific area of the memory 8 may be composed of a RAM and a ROM to store calling party information which should not be erased in the ROM.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus capable of being connected to a communication line through which calling party information comes at the time of termination, the communication apparatus comprising:

calling party information receiving means for receiving calling party information which comes through the communication line;

first storing means for storing the calling party information received by the calling party information receiving means;

second storing means for storing specific calling party information indicative of calling party information not to be stored in the first storing means; and controlling means for, (a) determining whether the calling party information received by the calling party information receiving means is coincident with calling party information stored in the first storing means, and if so then storing incoming call date and time relating to the calling party information, but if not then proceeding to step (b) where the controlling means determines whether the calling party information received by the calling party information receiving means is coincident with calling party information stored in the second storing means, and if so controlling so that the received calling party information is not stored in the first storing means.

2. The communication apparatus of claim 1, further comprising operating means for inputting and erasing calling party information, wherein based on a direction from the operating means, the controlling means stores the calling party information in the second storing means or erases the calling party information stored in the second storing means.

3. The communication apparatus of claim 2, wherein the second storing means is composed of an erasable area in which it is possible to erase calling party information based on an operation of the operating means and an unerasable area in which it is impossible to erase calling party information based on an operation of the operating means.

4. The communication apparatus of claim 1, wherein also when the calling party information stored in the first storing means is coincident with the calling party information received by the calling party information receiving means, the controlling means controls so that the received calling party information is not stored in the first storing means.

5. The communication apparatus of claim 1, further comprising voice information converting means for converting information which can be stored in the first storing means, into voice signals, wherein in the case where a preset signal comes through the communication line, the controlling means causes the voice information converting means to convert the information stored in the first storing means, into voice signals to send out the voice signals to the communication line.

6. A method of receiving and processing calling party information including caller ID information over a communication line, the method comprising:

receiving the calling party information which comes through the communication line;

providing a first memory area for storing certain of the calling party information received through the communication line;

providing a second memory area for storing specific calling party information indicative of calling party information not to be stored in the first memory area; and determining whether the calling party information received through the communication line is coincident with calling party information stored in the first memory area, and if so then storing incoming call date and time relating to the calling party information, but if not then determining whether the calling party information received through the communication line is coincident with calling party information stored in the second storing area and if so not storing the received calling party information in the first storing area.

* * * * *